Nov. 8, 1955 E. DACKOR ET AL 2,722,867
METHOD OF AND APPARATUS FOR MACHINING
BLADE AIRFOIL SURFACES
Filed Nov. 6, 1948 6 Sheets-Sheet 2
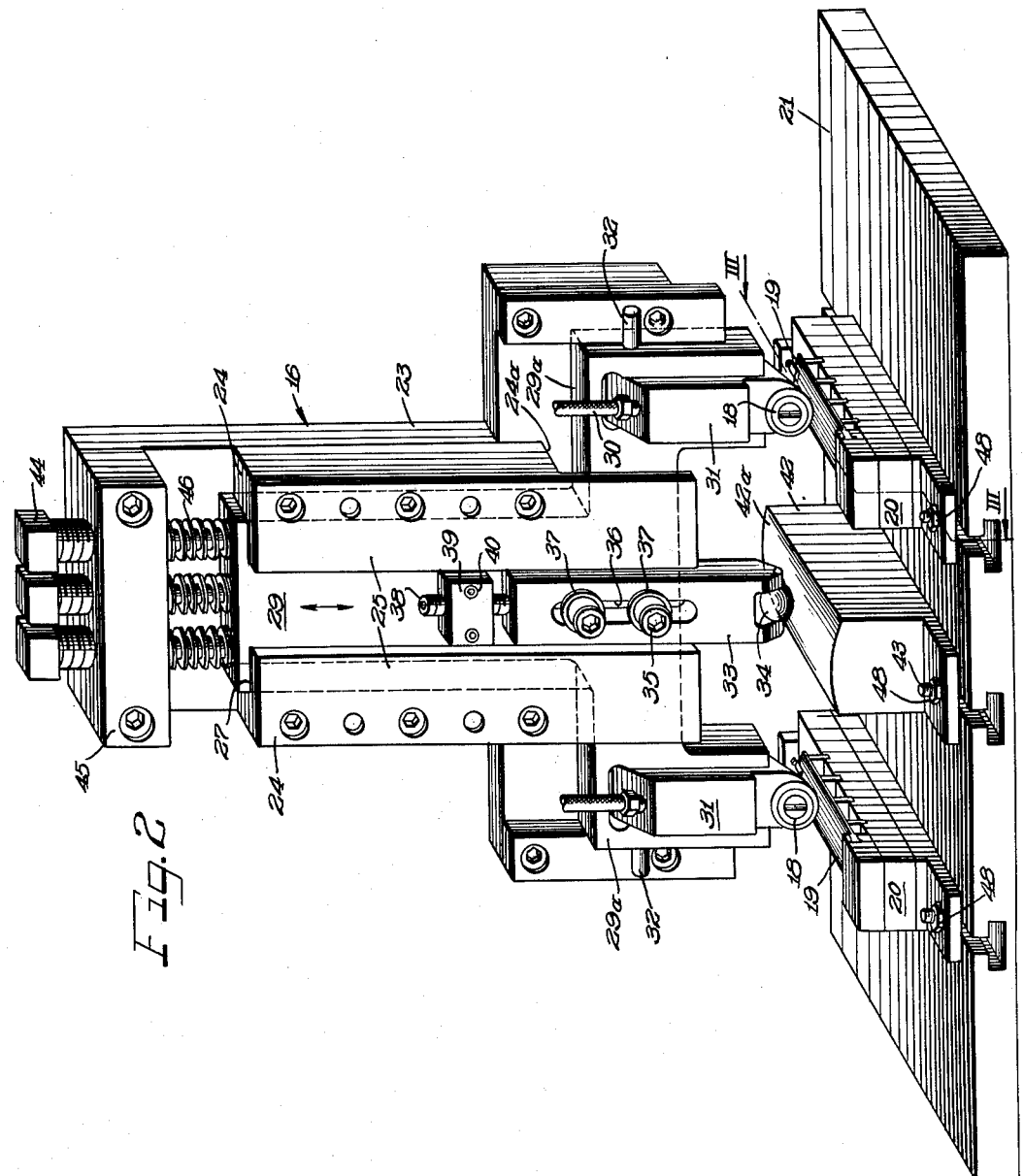
Inventors
Emil Dackor
Edgar F. Netboeck
By The Firm of Charles W. Hills Attys

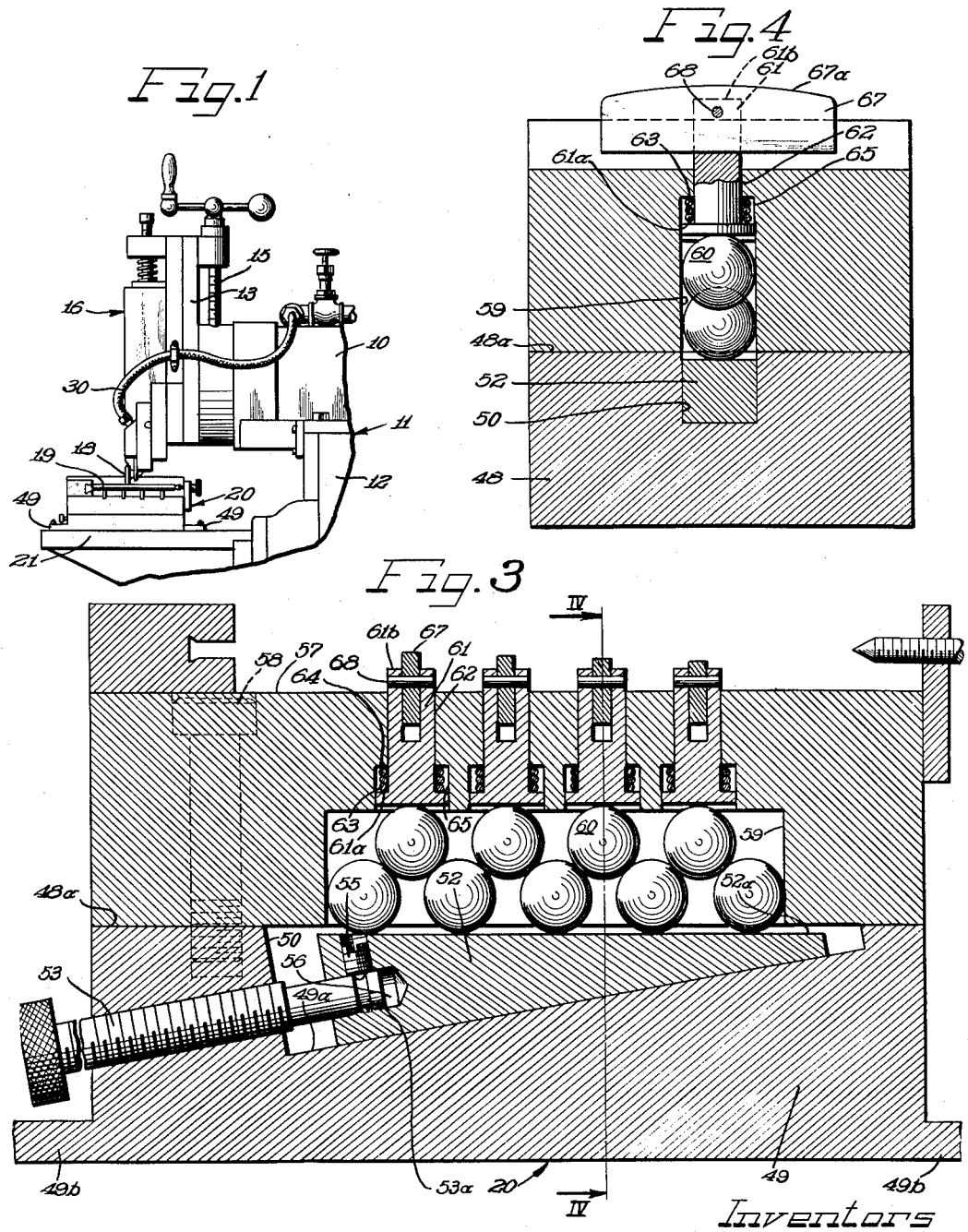

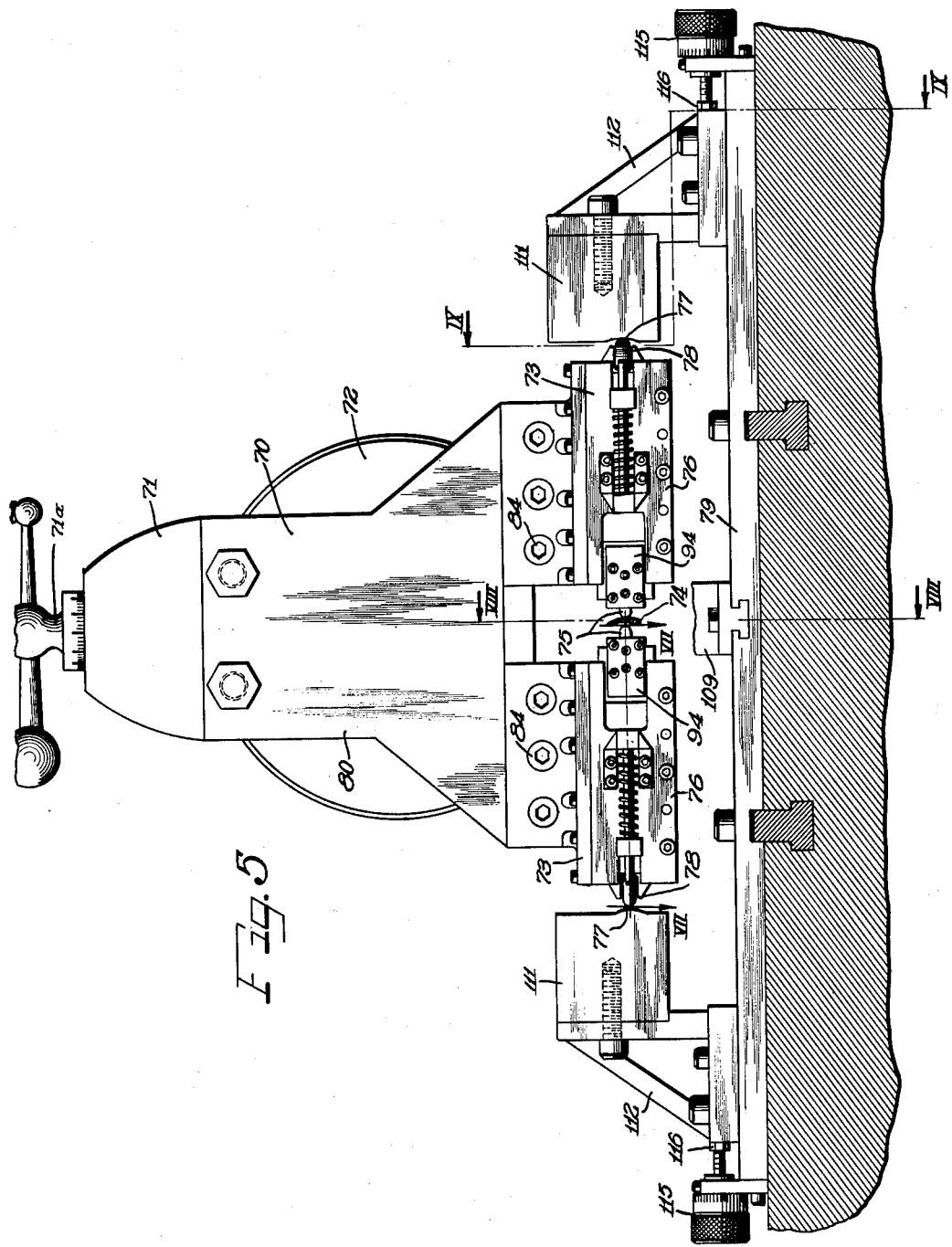

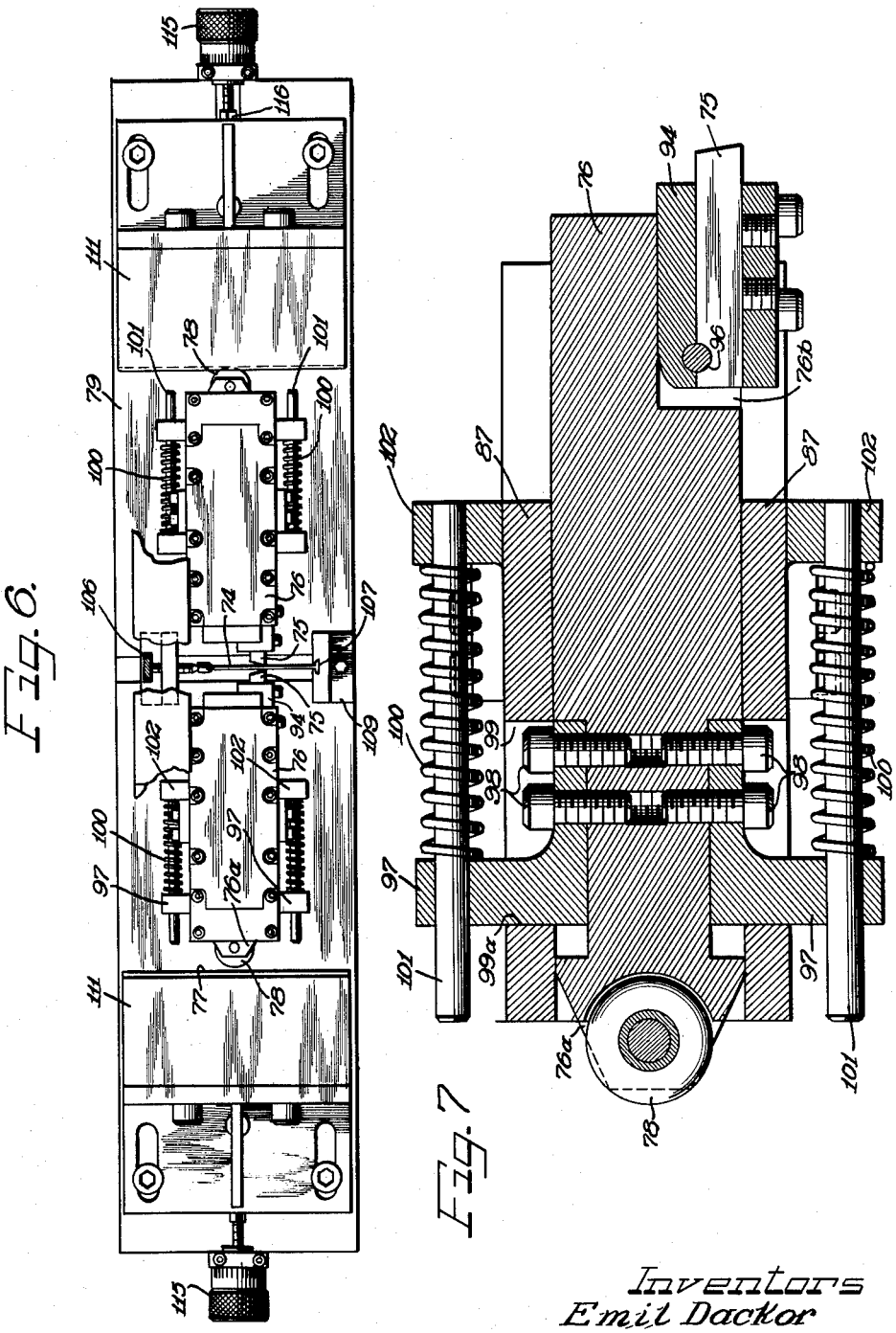

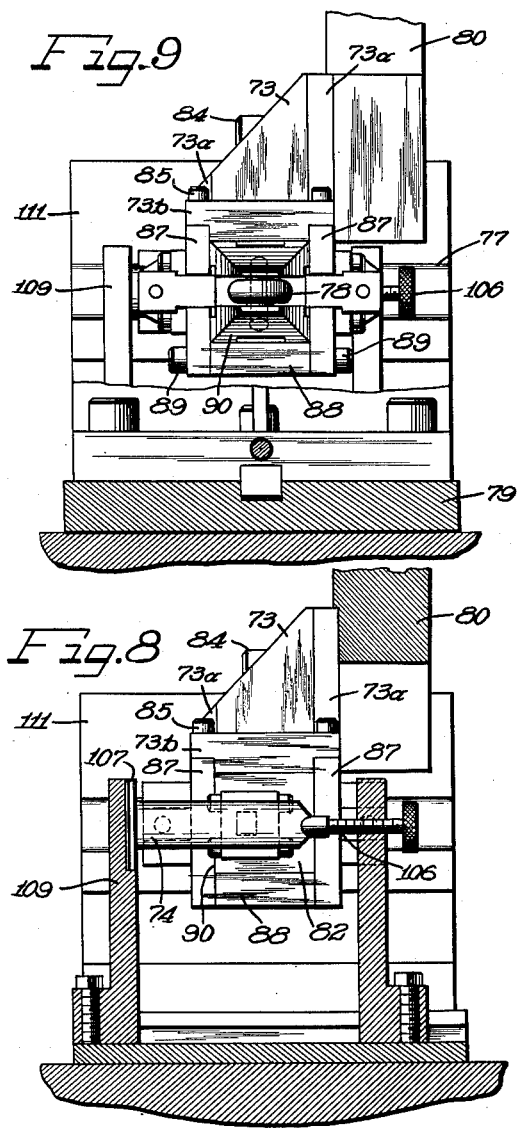

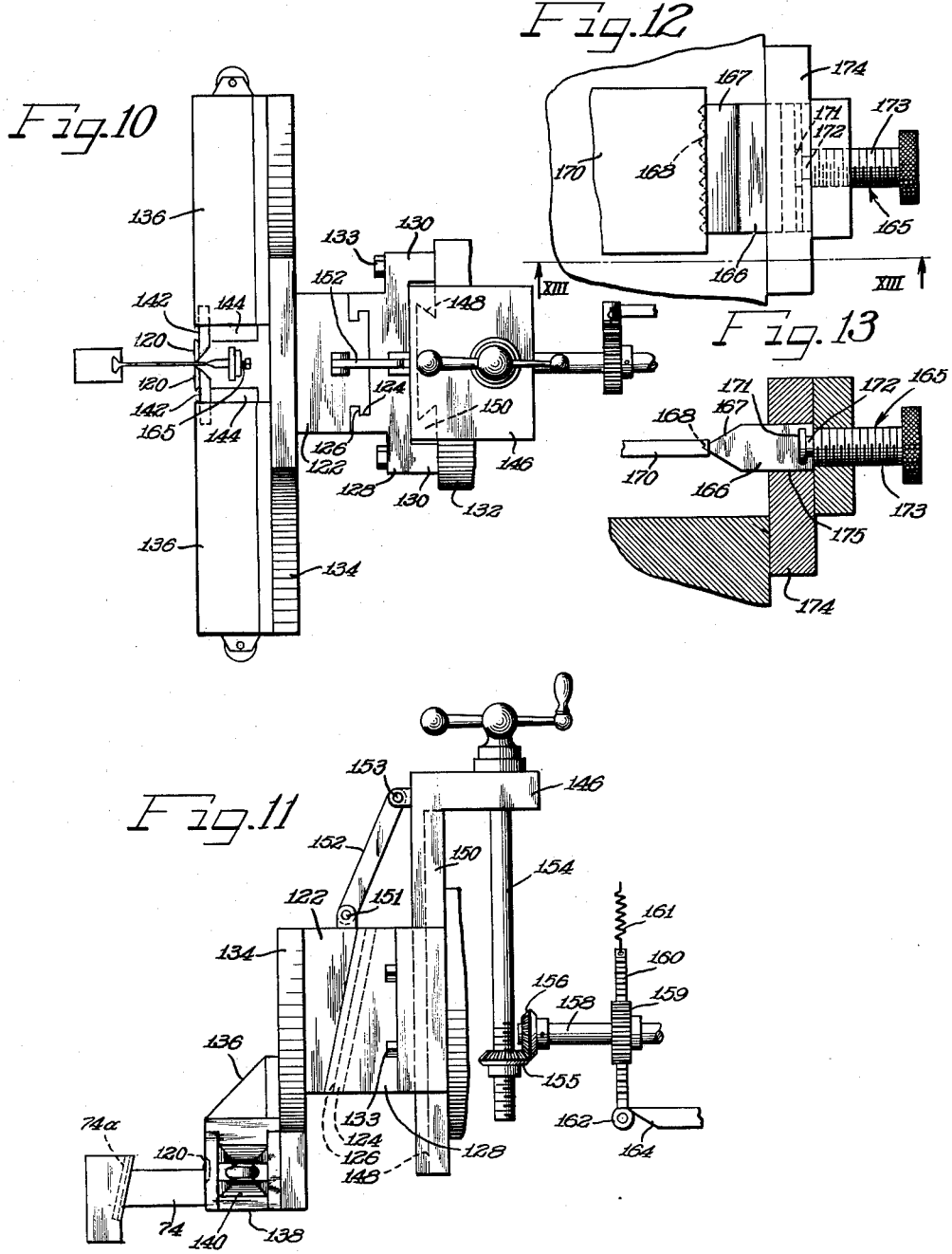

United States Patent Office 2,722,867
Patented Nov. 8, 1955

2,722,867

METHOD OF AND APPARATUS FOR MACHINING BLADE AIRFOIL SURFACES

Emil Dackor and Edgar F. Nelboeck, Cleveland, Ohio, assignors to Thompson Products, Inc., Cleveland, Ohio, a corporation of Ohio Application November 6, 1948, Serial No. 58,646

9 Claims. (Cl. 90—24.3)

This invention relates to improved apparatus for machining blade airfoil surfaces.

More particularly this invention has to do with an improved method of and apparatus for machining surfaces to produce thereon an irregular or curved contour by employing a master template and an improved follower unit.

Although the apparatus of the present invention is generally useful for machining various work pieces having irregular, complex surfaces, it has particular adaptation in the finish machining of airfoil surfaces on impeller blades such as those that are used in turbo-jet engines. These airfoil surfaces are necessarily very complex in order to produce maximum operating efficiency of the engine. The blades, therefore, usually have an arcuate airfoil transverse cross-section and are curved or twisted longitudinally of the blade. This complex surface of the blade has made it impractical to manually control formation of the blade surface.

Due to the general geometry of the blade and the fact that such blades are made of light materials such as aluminum or magnesium, it is imperative that substantial support be imparted to one face of the blade during machining operations on the other face.

If the blade is machined from a generally rectangular plane, no difficulty will be encountered in providing such support during machining of the first face of the blade. However, substantial difficulties are encountered in adequately supporting the blade during machining of the opposite face. The geometry and the material of the blade makes it sufficiently flexible that substantial inaccuracy in the formation of the second blade surface will result unless a rigid support is provided for substantially all of the blade surface opposed to that being machined.

In accordance with the features of the present invention there is provided a tool-carrying attachment or head that is arranged to be secured on the tool slide of a standard shaper. Forward movement of the ram of the shaper carries the head forwardly, causing the tools attached thereto to take a cutting stroke on a work piece mounted on a special work supporting fixture on the table of the shaper therebelow.

The head carries a spring pressed follower member that is mounted for slidable vertical movement therein. A roller at the lower end of the follower member is in contact with a master template secured to the table of the shaper. Reproducer arms are connected to the follower member for movement therewith, each arm carrying at its lower end a cutting tool disposed for machining the work piece in the work supported fixture.

The work supporting fixture is provided at either end with means for engaging the work piece and with a supporting base which automatically assumes the contour of the bottom side of the work piece and engages it in supporting relation.

Thus, as the ram of the shaper moves in and out, movement of the roller follower on the master template is imparted to the tools for cutting a surface of identical configuration on each work piece.

In a second embodiment of the invention, tools associated with separate master templates are secured in opposed relation on the tool slide of the shaper. A work piece is supported between the tools so that upon forward movement of the ram, the tools simultaneously make cutting strokes on opposite sides of the work piece, each cutting tool tending to support the work during the cutting stroke of the opposed tool. By machining both sides of the blade simultaneously, both machined surfaces will be in proper relation to each other when the operation is finished.

It is, therefore, an important object of the present invention to provide an improved method for machining a complex work piece such as an impeller blade.

Another object of the present invention is to provide an improved fixture for supporting a complex work piece during machining operation.

A still further object of the present invention is to provide an improved means for machining a complex surface by use of a master template and an automatic reproducing mechanism adapted for operation by the ram of a standard shaper.

Another object of the present invention is to provide improved means for economically finish-machining the airfoil surface on an impeller blade by cutting longitudinally of the blade.

Another and still further object of the present invention is to provide a novel clamp for supporting a work piece.

A further object of this invention is to provide an improved means for machining the surface of an impeller blade that has its longitudinal axis inclined to its supporting base or root portion.

The specific nature of the invention, as well as other objects and advantages thereof, will become apparent to those skilled in the art from the following detailed description of the annexed sheets of drawings which, by way of preferred examples only, illustrate embodiments of this invention.

Figure 1 is a fragmentary side elevational view of the machining attachment of the present invention shown secured to the ram of a standard tool room shaper;

Figure 2 is an isometric view of the machining attachment of the present invention shown disconnected from the shaper but showing the work piece mounted on the table of the shaper;

Figure 3 is a vertical sectional view taken substantially on line III—III of Figure 2;

Figure 4 is a vertical sectional view taken on line IV—IV of Figure 3;

Figure 5 is a fragmentary front elevational view with parts in section and parts broken away, showing a second embodiment of the machining attachment of the present invention;

Figure 6 is a fragmentary plan view, with parts broken away and parts in section, of the machine attachment of Figure 5 shown mounted over the table of a typical tool room shaper;

Figure 7 is a horizontal sectional view taken on line VII—VII of Figure 5;

Figure 8 is a fragmentary vertical sectional view taken on line VIII—VIII of Figure 5; and Figure 9 is a fragmentary vertical sectional view taken on line IX—IX of Figure 5.

Figure 10 is a fragmentary top plan view of a modified form of the machining attachment of the present invention.

Figure 11 is a fragmentary side elevation of the machining attachment of Figure 10.

Figure 12 is a fragmentary plan view of a modified work clamp mounted on a machine.

Figure 13 is a vertical view taken on line XIII—XIII of Figure 12.

As shown on the drawings:

In Figure 1, the reference numeral 10 indicates the ram of a standard tool room shaper 11. The ram is arranged to slide on the support base 12 of the shaper in a reciprocating movement from left to right, as seen in Figure 1. A tool slide 13 is adjustable in a vertical direction relative to the ram 10 by means of an adjusting screw 15. The novel machining attachment 16 of the present invention is secured to the tool slide 13 and carries at its lower end a tool 18 which is arranged to make a longitudinal cutting stroke on an impeller blade 19 mounted in a fixture 2 which is secured to the table 21 of the shaper 11.

The machining attachment 16 comprises an inverted T-shaped backing plate 23 (Figure 2) which is secured by bolts (not shown) to the tool slide 13. A pair of guide blocks 24 are secured in opposed relation on the backing plate having arm members 25 which are spaced from the backing plate and extend toward each other defining a passageway 27. A tool-carrying head 29 is slidably disposed in the passageway 27 and has integrally formed arms 29a which extend laterally through cut-out portion 24a in the lower end of the guide block 24. Clapper boxes 31 of standard design are pivotally mounted in downwardly projecting extension of the arms 29a on pins 32 disposed therein. The circular cutting tool 18 is secured at the lower end of each clapper box 31 and is arranged to take a longitudinal cut in the blade 19 disposed therebelow as the ram moves forwardly along the supporting base of the shaper. On the return stroke of the shaper, the clapper box pivots the tool clear of the blade and returns it to its original position for executing the next cutting stroke. A tube 30 is arranged to deliver coolant to the cutting tool 18 through a passage in the clapper box. The table 21 is automatically indexed transversely of the shaper during the return stroke of the ram so that a new surface of the blade is presented to the cutter on the next stroke.

A follower arm 33, having a roller 34 rotatably mounted at the lower end thereof, is slidably disposed between the side faces of the opposed guide arms 25. Bolts 35, passing through an aperture 36 in the arm 33, threadingly engage the slide 29 and urge washers 37 against the arm 33 to hold it fixed relative to the slide 29. An adjusting screw 38 is threaded through a block 39 which is secured to the slide 29 by cap screw 40. Thus, when the bolts 35 are retracted, the position of the follower arm may be adjusted by rotation of the screw 38.

As seen in Figure 2, a master template 42 made of hardened steel is secured to the table 21 by bolts 43 disposed in T slots therein. The template 42 has a camming surface 42a which has the contour desired for the finished blade.

To maintain the roller 34 of the follower unit in contact with the camming surface 42a, there is secured in the upper end of the slide 29 a plurality of screws 44 which are threadingly engaged through an arm 45, which is secured to the backing plate 23. Springs 46, disposed between the arm 45 and the top of the slide 29, urge the follower arm downwardly causing the roller 34 to contact the camming surface 42a.

The mounting fixture 20 which supports the blades 19 in position is secured to the table 21 by bolts 48 disposed in T slots in the table. The fixture 20 (Figure 3) includes a base 49 of generally rectangular configuration in both longitudinal and transverse cross-section. Flange portions 49b extend longitudinally away from each end of the base for receiving the bolts 48 for securing the fixture to the table 21. A recessed groove 50 is provided in the upper surface of the base 49 having an upwardly slanted wall 49a on which a wedge block 52 is slidably disposed.

This wedge block 52 has an upper surface 52a substantially parallel to the upper wall 48a of the base 49. An adjustment screw 53 is threaded through the base 48 and has a forward end 53a held by a set screw 55 in a recess 56 in the wedge block 52.

An upper cover member 57 suitably secured as by cap screws 58 to the base 48 has a groove 59 in its lower surface confronting the groove 50 in the base 48. A plurality of ball bearings 60 disposed in rows in staggered relation are movable by the wedge block 52 to slide plungers 61 upwardly in guide apertures 62 of the cover member 57. Springs 63, disposed between a shoulder 64 provided by a recess 65 in the cover 57 and the enlarged head 61a of the plunger 61, resists the action of the ball bearings. Each plunger 61 has an upper bifurcated end 61b in which a support strap 67 is pivotally disposed on a pin 68. The strap 67 has an upper work contacting surface 67a (Figure 4) which has a curvature conforming to the curvature of the lower side of the blade with which it is in contact. It is evident therefore that if the curvature of the lower surface of the blade varies longitudinally, the curvature of the surface 67a of each adjacent strap 67 will also vary.

Thus, there is provided in the present invention a simple, efficient machining attachment arranged for operation from the ram of a shaper. By use of a master template, surfaces are accurately machined on a work piece. Further, the use of longitudinal cutting strokes, as distinguished from short transverse cutting strokes, greatly reduces the time expended in the machining operation, and the use of a self-adjusting work holding fixture facilitates the correct positioning of the blade.

In Figure 5 is illustrated a second embodiment of the machining fixture of the present invention. This attachment 70 is secured to the tool slide 71 of the ram 72 of the shaper and includes a pair of depending bracket assemblies 73. The tool slide 71 is arranged for automatic indexing in a vertical direction through screw 71a through standard shaper mechanism. A work piece 74 is supported transversely across the table of the shaper between opposed tools 75 secured to clapper boxes 94 which are hinged on plunger 76 slidably disposed in the brackets 73. As the ram moves forwardly, the tools 75 are urged against the work piece by the action of cams 77 acting on roller followers 78 secured to the opposite end of the plunger 76. As the ram moves forwardly, the tools make a cutting stroke on the work piece, and as the ram moves backwardly in its return stroke, the slide 71 of the shaper is automatically indexed vertically to position the roller follower 78 on another portion of the cam 77.

Each attachment assembly 70 comprises a backing plate 80 which is secured to the tool slide 71. In the lower end of the backing plate 80, two spaced support brackets 73 are secured by bolts 84. The brackets 73, having substantially triangular cross-section as seen in Figures 8 and 9, are provided with recesses 73a in which the head 85 of the bolts 86 is disposed. These bolts 86 pass through the flat base 73b of each support bracket 73 and engage upstanding plates 87 which extend the entire length of the bracket 73. A plate 88 is secured by bolts 89 between the lower end of the side plate 87. Thus, as best seen in Figures 8 and 9, the base 73b of the bracket 73, the side plates 87, and the bottom plate 88 define an elongated, substantially square passageway 90.

A plunger 76 is disposed for sliding movement in each of the passageways 90. Each plunger has a bifurcated end portion 76a in which is journalled a roller 78 (Figure 7). At the other end, a clapper box 94, carrying a cutting tool 75, is pivotally mounted on a pin 96 in a cut-out portion 76b of the plunger 76. Arms 97 are secured by cap screws 98 to either side of the plunger 76 extending through apertures 99 in the side walls 87. A coil spring 100 is disposed over a rod 101 which is secured in an ear 102 of the wall 87 and extends freely through the arm 97 of the plunger 76. The spring 100 thus urges the plunger 76 toward the left, as seen in Figure 7, against the template 77 (Figure 5).

Referring to Figures 5 and 6, it is seen that the work piece or blade 74 is held in a position transversely of the table 79 between an adjustable center 106 and in a dove-tailed groove 107 in a block 109. A block 111 having a cam surface 77 is secured to a support structure 112 slidably disposed on the table 79. Adjustment devices 115 are secured to the table 79 having a screw 116 engaging each adjustment mechanism for moving the same relative to the table 79.

In operation, during the forward motion of the ram, the cam followers 78 contact the cam surfaces 77 of the blocks 111 and urge the plungers 76 in the passageways 90 inwardly so that the tools 75 contact the work piece and make a cutting stroke longitudinally of the work piece. It is to be particularly noted that in this operation each cutting tool not only takes its own cutting stroke but acts as a support or brace for the opposite cutting tool as it takes its cutting stroke. Further, it will be recognized that by this simultaneous method of cutting opposite surfaces of a blade the surfaces will, at the end of the cutting operation, have a definite predetermined relation to each other.

On the return stroke of the ram, the slide 71 is indexed vertically to position another portion of the cam surface 77 opposite the cam follower 78, and thus a different cutting stroke is made on the work piece.

The disclosures of Figures 5, 6, 7, 8 and 9 have been particularly concerned with a machine and mounting attachment arranged to take a longitudinal cut in a blade 74 (Figure 6) that has an end portion 74a, which fits in the dove-tail groove 107, disposed substantially normal to the longitudinal axis of the blade. However, some blades have the root or end portion 74a disposed at an angle to the axis of the blade as seen in Figure 11. In this case, in order to cut close to the angled root it is necessary that the cutting stroke be adjusted as the tool is indexed between successive strokes. This shifting of the stroke brings the tool progressively forward to end the cuts parallel with and close to the root.

For example, if the circular cutters 120 of Figure 11 are arranged to take their first cuts at the upper edge of the blade 74 and to be indexed downwardly for subsequent cuts, and if the angle of the end 74a is as shown in Figure 11, then every time the tools are indexed downwardly their cutting stroke must also be moved forwardly so that the cuts will terminate close to the end 74a.

To accomplish this forward and downward indexing of the cutting tool 120, the slide 122 is provided with gibs 124 (Figure 10) slidably disposed in downwardly and forwardly slanted ways 126 formed in a block 128 which has leg portions 130 secured to the shaper ram 132 by bolts 133. A backing plate 134 is secured by any suitable means to the forward end of the slide 122 and carries at its lower end spaced brackets 136 each of which support housings 138. It will be understood that the housings 138 define passageways 140 which are similar to the passageways 90 illustrated in Figures 8 and 9. Further, it is to be understood that the mechanism disposed for operation in the passageways 140 is the same as that described and illustrated in connection with the passageways 90.

The tools 120 of Figures 11 and 10 are circular in shape and are mounted by any suitable means, as by clapper boxes 142, on the plunger assemblies 144.

The slide 122 has a supporting member 146 which is slidably disposed in ways 148 formed in a portion 150 of the frame of the shaper. The member 146 is connected to the slide 122 by a link 152 which is pivotally attached to both the slide and the member 146 as at 151 and 153, respectively.

The support member 146 may be automatically indexed in a vertical direction by any standard shaper mechanism. In Figures 10 and 11 one such mechanism is illustrated in which a shaft 154 engages the support member 146 at its upper end and has a lower end in threaded engagement with a bevel gear 155 journaled in the ram of the shaper. A second bevel gear 156 is in mesh with the gear 155 and is keyed to a shaft 158 which carries a pinion gear 159. A rack 160, urged by a spring 161, engages the pinion gear 159. A roller 162 on the rack is in the path of a cam 164 on the shaper frame and on the return stroke of the ram this cam 164 actuates the roller.

Thus, as the ram moves backwardly in its return stroke, the cam 164 pulls the rack to cause the gears 159, 156 and 155 to be rotated, thus raising or lowering the shaft 154, depending upon the pitch of the threads on the shaft. It will be understood, of course, that an overrunning clutch or a similar mechanism must be incorporated in the mounting of the gear 159 in order that the gear train will not be rotated in reverse when the spring 161 pulls the rack 160 to its starting position during the forward movement of the ram.

In Figures 12 and 13 a modified work-holding clamp 165 is illustrated. The clamp 165 comprises a generally rectangular body portion 166 with a wedge-shaped head 167. The head has a thin or short notched or serrated forward edge 168 which is forced into the end of the work piece 170. A T-shaped slot 171 is provided at the opposite end of the body portion 166 arranged to receive a similarly shaped end 172 of an adjusting screw 173 which is threaded into the clamp support structure 174.

By means of the adjusting screw 173 sufficient pressure can be exerted on the clamp body 166, which is guided in an opening 175 of the structure, to force the serrated end 168 into the work piece.

This type of clamp may be used in any of the previously described machining attachments of the present invention. In Figures 10 and 11 it is shown in supporting engagement with the work piece 74.

It will, of course, be understood that various details of construction may be modified through a wide range without departing from the principles of this invention, and it is, therefore, not the purpose to limit the patent granted hereon otherwise than necessitated by the scope of the appended claims.

We claim as our invention:

1. A machining attachment comprising a support base, a head movable relative to said base, a table disposed below said head, a template mounted on said table, a follower mounted on said head and spring-pressed against said template, and a plurality of tools secured in fixed relation to said follower and disposed for contact with work pieces mounted on said table, the cutting path of said tools being determined by the path said follower traces over said template.

2. A machining attachment adapted for use with a shaper having a reciprocating ram, a tool slide and a table comprising a backing plate secured to said tool slide, a block slidably mounted on said backing plate, a template secured to said table below said block, a follower adjustably secured to said block, and a clapper box pivotally mounted in said block carrying a tool in contact with a work piece on said table.

3. A work holder comprising a housing with a central chamber and a plurality of guide passageways connecting said chamber with the exterior of said housing, plungers in said guide passageways, means at both ends of said housing for supporting a work piece therebetween and above said guide passageways, wedge means in said chamber in contact with each of said plungers for moving said plungers in said passageways, a work contacting member pivotally secured at the end of each plunger, and means for adjusting said wedge means to move said plungers out of said guide passageways and moving said work-contacting members into supporting engagement with the work piece.

4. A clamp assembly for holding one end of a work piece comprising a support structure having a guide passageway, a clamp body slidably disposed in said passageway having a wedge-shaped end portion with a serrated work-engaging edge, and an adjusting screw threaded into said support structure and positively engaging said clamp body.

5. A machine adapted for forming airfoil contours and twisted profiles on work pieces such as turbine blades and the like which comprises a reciprocable carriage, a spring-loaded tool carrier on said carriage, a cam follower controlling the position of the tool carrier on the carriage, a cam having a contour desired for the work piece acting on said cam follower, a support for the work piece opposing said tool carrier, and means for adjusting said support to fit the work piece to prevent deflection thereof under the influence of the spring-loaded tool carrier.

6. An attachment for a shaper having a reciprocating ram and a table, which comprises a pair of spring-loaded tool carriers mounted on said ram, cam follower means controlling the path of the tool carriers as the ram reciprocates, cam means coacting with said cam follower means, work support means opposing the tool carriers for securing the work against deflection when acted on by the tool carriers, and indexing means for shifting the work relative to the tool carriers.

7. An attachment for a shaper having a reciprocating ram and a laterally shiftable index table which comprises a head adapted for mounting on said ram, a tool carriage slidable on said head toward and away from said table, said tool carriage having laterally spaced tool-carrying members and a cam follower therebetween, work holders on said table, adjustable means on said work holders for supporting elongated work pieces along their length to prevent deflection of the work pieces, and a cam on said table between said work holders coacting with said follower to control the action of tools carried by the tool holders as said ram reciprocates the tool carriages.

8. In a machine including a reciprocable head and a cutting tool carried by said head, means for supporting a blank for operative engagement with said cutting tool comprising: means engaging opposite ends of said blank, a plurality of supports engaging said blank intermediate said ends, wedge means for limiting movement of said supports away from the blank to fix the position of longitudinally spaced portions thereof, and a plurality of ball bearings intermediate said wedge means and said supports.

9. In a machine including a reciprocable head and a cutting tool carried by said head, means for supporting a blank for operative engagement with said cutting tool comprising: means engaging opposite ends of said blank, a plurality of supports engaging said blank intermediate said ends, and a plurality of ball bearings engaging and limiting movement of said supports away from said blank to fix the position of longitudinally spaced portions thereof.

References Cited in the file of this patent

UNITED STATES PATENTS

| | | |
|---|---|---|
| 1,254,044 | Johnson | Jan. 22, 1918 |
| 1,678,651 | Riordan | July 31, 1928 |
| 1,938,337 | Janiszewski | Dec. 5, 1933 |
| 2,154,718 | Bannon | Apr. 1, 1939 |
| 2,223,038 | Jackson | Nov. 26, 1940 |
| 2,235,578 | Ford | Mar. 18, 1941 |
| 2,299,294 | Barnes | Oct. 20, 1942 |
| 2,349,171 | Jackson | May 16, 1944 |
| 2,355,811 | Martindell | Aug. 15, 1944 |
| 2,357,790 | Turchan et al. | Sept. 5, 1944 |
| 2,484,553 | Carson | Oct. 11, 1949 |
| 2,485,716 | Eberlein et al. | Oct. 25, 1949 |

FOREIGN PATENTS

| | | |
|---|---|---|
| 478,148 | Germany | June 18, 1929 |